US012626354B2

(12) United States Patent
Zhang et al.

(10) Patent No.: US 12,626,354 B2
(45) Date of Patent: \*May 12, 2026

(54) LEARNABLE DEFECT DETECTION FOR SEMICONDUCTOR APPLICATIONS

(71) Applicant: KLA Corporation, Milpitas, CA (US)

(72) Inventors: Jing Zhang, Santa Clara, CA (US);
Zhuoning Yuan, Iowa City, IA (US);
Yujie Dong, Newark, CA (US); Kris Bhaskar, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 564 days.

This patent is subject to a terminal disclaimer.

(21) Appl. No.: 18/078,989

(22) Filed: Dec. 11, 2022

(65) Prior Publication Data

US 2023/0118839 A1 Apr. 20, 2023

Related U.S. Application Data

(62) Division of application No. 16/838,037, filed on Apr. 2, 2020, now Pat. No. 11,551,348.

(Continued)

(51) Int. Cl.
*G06N 3/08* (2023.01)
*G06N 3/04* (2023.01)
(Continued)

(52) U.S. Cl.
CPC .............. *G06T 7/001* (2013.01); *G06N 3/04* (2013.01); *G06N 20/00* (2019.01);
(Continued)

(58) Field of Classification Search
USPC .............. 216/2–109; 382/141–159, 181–224
See application file for complete search history.

(56) References Cited

U.S. PATENT DOCUMENTS 8,761,490 B2 * 6/2014 Scheid .............. G01N 21/8851
382/145
10,186,026 B2 * 1/2019 Karsenti ............. G06F 18/2453
(Continued)

FOREIGN PATENT DOCUMENTS

TW 200617369 6/2006
TW 201117128 5/2011
(Continued)

OTHER PUBLICATIONS

Im Wook-Bin; Cell Abnormality Diagnosing System Using DNN Learning, and Diagnosis Managing Method of Same; 2018 (Year: 2018).*

(Continued)

*Primary Examiner* — Marcellus J Augustin
(74) *Attorney, Agent, or Firm* — Entropy Matters LLC

(57) ABSTRACT

Methods and systems for learnable defect detection for semiconductor applications are provided. One system includes a deep metric learning defect detection model configured for projecting a test image for a specimen and a corresponding reference image into latent space, determining a distance in the latent space between one or more different portions of the test image and corresponding portion(s) of the corresponding reference image, and detecting defects in the one or more different portions of the test image based on the determined distances. Another system includes a learnable low-rank reference image generator configured for removing noise from one or more test images for a specimen thereby generating one or more reference images corresponding to the one or more test images.

20 Claims, 4 Drawing Sheets

Related U.S. Application Data

(60) Provisional application No. 62/831,532, filed on Apr. 9, 2019.

(51) Int. Cl.
  G06N 20/00     (2019.01)
  G06T 7/00     (2017.01)

(52) U.S. Cl.
  CPC ............... *G06T 2207/20081* (2013.01); *G06T 2207/20084* (2013.01); *G06T 2207/30148* (2013.01)

(56)     References Cited

U.S. PATENT DOCUMENTS

| | | | |
|---|---|---|---|
| 2003/0106037 A1 | 6/2003 | Moniwa et al. | |
| 2006/0103838 A1* | 5/2006 | Richter | G01N 21/95607 |
| | | | 356/237.5 |
| 2011/0112999 A1 | 5/2011 | Lee et al. | |
| 2017/0059491 A1 | 3/2017 | Duffy et al. | |

| | | | |
|---|---|---|---|
| 2017/0148226 A1 | 5/2017 | Zhang et al. | |
| 2017/0351952 A1* | 12/2017 | Zhang | G06N 3/04 |
| 2018/0164792 A1 | 6/2018 | Lin et al. | |
| 2018/0330511 A1* | 11/2018 | Ha | G06F 30/00 |
| 2019/0279349 A1* | 9/2019 | Morino | G06T 7/11 |
| 2020/0234417 A1* | 7/2020 | Cohen | G06T 7/001 |

FOREIGN PATENT DOCUMENTS

| | | |
|---|---|---|
| TW | 201725381 | 7/2017 |
| TW | 201740349 | 11/2017 |
| TW | 201802726 | 1/2018 |
| TW | 201822038 | 6/2018 |

OTHER PUBLICATIONS

Zhang, Zhao; An Image Restoration and De-noising Method and System; 2016 (Year: 2016).*

Jinghui et al., "Image Memorability Prediction Model Based on Low-Rank Representation Learning," Laser & Optoelectronics Progress, 55, 071002 (Jan. 2018), 7 pages.

* cited by examiner

LEARNABLE DEFECT DETECTION FOR SEMICONDUCTOR APPLICATIONS

BACKGROUND OF THE INVENTION

1. Field of the Invention

The present invention generally relates to methods and systems for learnable defect detection for semiconductor applications. Certain embodiments relate to systems and methods for detecting defects on a specimen using a deep metric learning defect detection model and/or a learnable low-rank reference image generator.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Most inspection methods include two major steps: generating a reference image followed by performing defect detection. There are many different ways to perform each step. For example, a reference image may be generated by determining a median or average of multiple images. In another example, the reference image may be a constructed reference and alternatives based on low-rank approximation. Defect detection may also be performed in a number of different ways. For example, defect detection may be unsupervised using a subtraction-based detection algorithm (e.g., MDAT, LCAT, etc.). Alternatively, defect detection may be supervised using a pixel-level detection algorithm (e.g., single image detection performed using a deep learning (DL) model and electron beam images).

There are, however, a number of disadvantages to the various defect detection methods that are currently used. For example, generating a reference image by calculating a median or average is generally insufficient for dealing with die-to-die process variation although constructed reference and alternatives based on low-rank approximation partially addresses this issue. However, constructed reference and alternatives are potentially ineffective for sub-regions on a wafer and possibly destroy defect signals. Currently used unsupervised defect detection methods are disadvantageous because detection depends on the quality of the reference images and test images. Such unsupervised defect detection methods also do not provide selectivity on sensitivity enhancement for targeted defect types or relatively small defects. Supervised defect detection methods require a lot of labeled defect candidates for training, which in practice can be time consuming for recipe setup.

Accordingly, it would be advantageous to develop systems and methods for learnable defect detection for semiconductor applications that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes one or more computer systems and one or more components executed by the one or more computer systems. The one or more components include a deep metric learning (DML) defect detection model configured for projecting a test image generated for a specimen and a corresponding reference image into latent space. For one or more different portions of the test image, the DML defect detection model is also configured for determining a distance in the latent space between the one or more different portions and corresponding one or more portions of the corresponding reference image. In addition, the DML defect detection model is configured for detecting defects in the one or more different portions of the test image based on the distances determined for the one or more different portions of the test image. The system may be further configured as described herein.

Another embodiment relates to a computer-implemented method for detecting defects on a specimen. The method includes projecting a test image generated for a specimen and a corresponding reference image into latent space. The method also includes, for one or more different portions of the test image, determining a distance in the latent space between the one or more different portions and corresponding one or more portions of the corresponding reference image. In addition, the method includes detecting defects in the one or more different portions of the test image based on distances determined for the one or more different portions of the test image, respectively. The projecting, determining, and detecting steps are performed by a DML defect detection model that is included in one or more components executed by one or more computer systems.

Each of the steps of the method described above may be further performed as described herein. In addition, the embodiment of the method described above may include any other step(s) of any other method(s) described herein. Furthermore, the method described above may be performed by any of the systems described herein.

An additional embodiment relates to a non-transitory computer-readable medium storing program instructions executable on one or more computer systems for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

A further embodiment relates to a system configured to generate a reference image for a specimen. The system includes one or more computer systems and one or more components executed by the one or more computer systems. The one or more components include a low-rank reference image generator. The one or more computer systems are configured for inputting one or more test images for a specimen into the learnable low-rank reference image generator. The one or more test images are generated for different locations on the specimen corresponding to the same location in a design for the specimen. The learnable low-rank reference image generator is configured for removing noise from the one or more test images thereby generating one or more reference images corresponding to the one or more test images. A defect detection component detects defects on the specimen based on the one or more test images and their corresponding one or more reference images. The system may be further configured as described herein.

Another embodiment relates to a computer-implemented method for generating a reference image for a specimen. The method includes inputting one or more test images for a specimen into a learnable low-rank reference image generator. The learnable low-rank reference image generator is included in one or more components executed by one or more computer systems. The one or more test images are generated for different locations on the specimen corresponding to the same location in a design for the specimen. The learnable low-rank reference image generator is configured for removing noise from the one or more test images thereby generating one or more reference images corresponding to the one or more test images. A defect detection component detects defects on the specimen based on the one or more test images and their corresponding one or more reference images.

Each of the steps of the method described above may be further performed as described herein. In addition, the embodiment of the method described above may include any other step(s) of any other method(s) described herein. Furthermore, the method described above may be performed by any of the systems described herein.

An additional embodiment relates to a non-transitory computer-readable medium storing program instructions executable on one or more computer systems for performing a computer-implemented method for generating a reference image for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
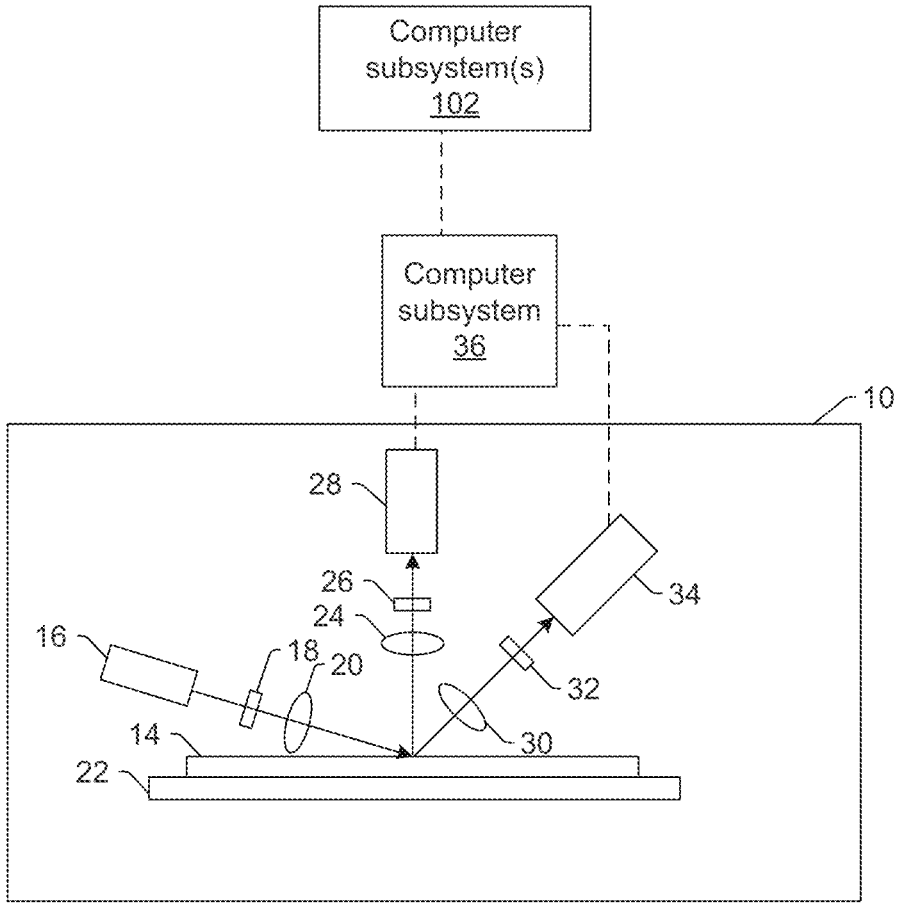
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a specimen. The embodiments described herein generally relate to deep learning (DL) and machine learning (ML) based defect detection methodologies for tools such as optical inspection tools. Some embodiments are generally configured for learnable low-rank defect detection for semiconductor inspection and metrology applications.

The systems described herein may include an imaging system that includes at least an energy source and a detector. The energy source is configured to generate energy that is directed to a specimen. The detector is configured to detect energy from the specimen and to generate images responsive to the detected energy. In one embodiment, the imaging system is configured as an optical imaging system. One embodiment of such an imaging system is shown in FIG. 1.

In one embodiment, the specimen is a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens. In another embodiment, the specimen is a reticle. The reticle may include any reticle known in the art.

The imaging system shown in FIG. 1 generates optical images by directing light to or scanning light over the specimen and detecting light from the specimen. In the embodiment of the system shown in FIG. 1, imaging system 10 includes an illumination subsystem configured to direct light to specimen 14. The illumination subsystem includes at least one light source. For example, as shown in FIG. 1, the illumination subsystem includes light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging system may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different oblique angle of incidence or a normal (or near normal) angle of incidence.

In some instances, the imaging system may be configured to direct light to the specimen at more than one angle of incidence at the same time. For example, the illumination subsystem may include more than one illumination channel, one of the illumination channels may include light source 16, optical element 18, and lens 20 as shown in FIG. 1, and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 is a broadband plasma (BBP) light source. In this manner, the light generated by the light source and directed to the specimen may include broadband light. However, the light source may include any other suitable light source such as any suitable laser known in the art configured to generate light at any suitable wavelength(s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging system may be configured to alter one or more of the elements of the illumination subsystem based on the type of illumination to be used for imaging.

The imaging system may also include a scanning subsystem configured to cause the light to be scanned over the specimen. For example, the imaging system may include stage 22 on which specimen 14 is disposed during imaging. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion such as in a serpentine-like path or in a spiral path.

The imaging system further includes one or more detection channels. At least one of the one or more detection channels includes a detector configured to detect light from the specimen due to illumination of the specimen and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging system that includes two detection channels, the imaging system may include a different number of detection channels (e.g., only one detection channel or two or more detection channels). In one such instance, the detection channel formed by collector 30, element 32, and detector 34 may form one side channel as described above, and the imaging system may include an additional detection channel (not shown) as another side channel that is positioned on the opposite side of the plane of incidence. Therefore, the imaging system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging system may also include two or more side channels configured as described above. As such, the imaging system may include at least three channels (i.e., one top channel and two side channels), and each of the at least three channels has its own collector, each of which is configured to collect light at different scattering angles than each of the other collectors.

As described further above, each of the detection channels included in the imaging system may be configured to detect scattered light. Therefore, the imaging system shown in FIG. 1 may be configured for dark field (DF) imaging of specimens. However, the imaging system may also or alternatively include detection channel(s) that are configured for bright field (BF) imaging of specimens. In other words, the imaging system may include at least one detection channel that is configured to detect light specularly reflected from the specimen. Therefore, the imaging systems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detectors may include photo-multiplier tubes (PMTs), charge coupled devices (CCDs), time delay integration (TDI) cameras, and any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate the images described herein in a number of ways.

It is noted that FIG. 1 is provided herein to generally illustrate a configuration of an optical imaging system that may be included in the system embodiments described herein or that may generate images that are used by the system embodiments described herein. Obviously, the optical imaging system configuration described herein may be altered to optimize the performance of the system as is normally performed when designing a commercial imaging system. In addition, the systems described herein may be implemented using an existing system (e.g., by adding functionality described herein to an existing system) such as the 29xx/39xx series of tools that are commercially available from KLA, Milpitas, Calif. For some such systems, the embodiments described herein may be provided as optional functionality of the system (e.g., in addition to other functionality of the system). Alternatively, the optical imaging system described herein may be designed "from scratch" to provide a completely new optical imaging system.

Computer subsystem 36 may be coupled to the detectors of the imaging system in any suitable manner (e.g., via one or more transmission media, which may include "wired" and/or "wireless" transmission media) such that the computer subsystem can receive the output generated by the detectors for the specimen. Computer subsystem 36 may be configured to perform a number of functions described further herein using the output of the detectors.

The system may also include more than one computer subsystem (e.g., computer subsystem 36 and computer subsystem(s) 102 shown in FIG. 1), which may be configured differently or the same. The computer subsystems shown in FIG. 1 (as well as other computer subsystems described herein) may also be referred to as computer system(s). Each of the computer subsystem(s) or system(s) may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging system is described above as being an optical or light-based imaging system, in another embodiment, the imaging system is configured as an electron beam imaging system. For example, the system may also or alternatively include an electron beam imaging system configured to generate electron beam images of the specimen. The electron beam imaging system may be configured to direct electrons to or scan electrons over the specimen and to detect electrons from the specimen. In one such embodiment shown in FIG. 1a, the electron beam imaging system includes electron column 122 coupled to computer subsystem 124.

Figure 1A:
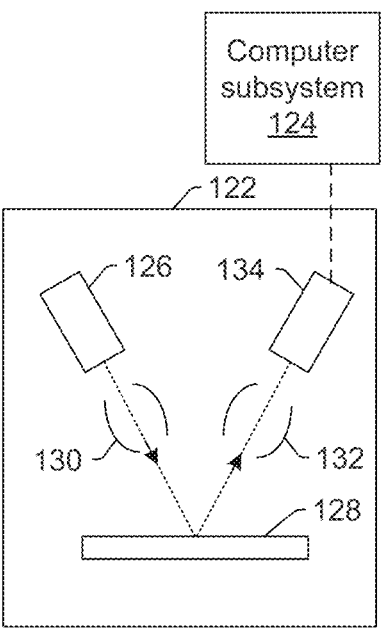

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No.

8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam imaging system may be configured to use multiple modes to generate images of the specimen as described further herein (e.g., with different illumination angles, collection angles, etc.). The multiple modes of the electron beam imaging system may be different in any image generation parameters of the electron beam imaging system.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the electron beam imaging system shown in FIG. 1a may be further configured as described herein.

It is noted that FIG. 1a is provided herein to generally illustrate a configuration of an electron beam imaging system that may be included in the embodiments described herein. As with the optical imaging system described above, the electron beam imaging system described herein may be altered to optimize the performance of the imaging system as is normally performed when designing a commercial imaging system. In addition, the systems described herein may be implemented using an existing system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging system is described above as being a light or electron beam imaging system, the imaging system may be an ion beam imaging system. Such an imaging system may be configured as shown in FIG. 1a except that the electron beam source may be replaced with any suitable ion beam source known in the art. In addition, the imaging system may be any other suitable ion beam imaging system such as those included in commercially available focused ion beam (FIB) systems, helium ion microscopy (HIM) systems, and secondary ion mass spectroscopy (SIMS) systems.

As noted above, the imaging system may be configured for directing energy (e.g., light, electrons) to and/or scanning energy over a physical version of the specimen thereby generating actual images for the physical version of the specimen. In this manner, the imaging system may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging system 10 and do not have any capability for handling the physical version of the specimen but may be configured as a virtual inspector that performs inspection-like functions using stored detector output. Systems and methods configured as "virtual" inspection systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, the one or more computer subsystems described herein may be further configured as described in these patents.

As further noted above, the imaging system may be configured to generate images of the specimen with multiple modes. In general, a "mode" can be defined by the values of parameters of the imaging system used for generating images of a specimen or the output used to generate images of the specimen. Therefore, modes that are different may be different in the values for at least one of the imaging parameters of the imaging system. For example, in an optical imaging system, different modes may use different wavelengths of light for illumination. The modes may be different in illumination wavelengths as described further herein (e.g., by using different light sources, different spectral filters, etc.) for different modes. In another embodiment, different modes use different illumination channels of the imaging system. For example, as noted above, the imaging system may include more than one illumination channel. As such, different illumination channels may be used for different modes.

The imaging systems described herein may be configured as inspection subsystems. If that is the case, the computer subsystem(s) may be configured to receive the output from the inspection subsystem as described above (e.g., from detector(s) of the imaging system) and may be configured to detect defects on the specimen based on the output as described further herein.

The imaging systems described herein may be configured as another type of semiconductor-related process/quality control type system such as a defect review system and a metrology system. For example, the embodiments of the imaging systems described herein and shown in FIGS. 1 and 1a may be modified in one or more parameters to provide different imaging capability depending on the application for which they will be used. In one embodiment, the imaging system is configured as an electron beam defect review system. For example, the imaging system shown in FIG. 1a may be configured to have a higher resolution if it is to be used for defect review or metrology rather than for inspection. In other words, the embodiments of the imaging system shown in FIGS. 1 and 1a describe some general and various configurations for an imaging system that can be tailored in a number of manners that will be obvious to one skilled in the art to produce imaging systems having different imaging capabilities that are more or less suitable for different applications.

The system configured to detect defects on a specimen includes one or more computer systems and one or more components executed by the one or more computer systems. The one or more computer systems may be configured as described above. The one or more components includes a deep metric learning (DML) defect detection model. The DML defect detection model may have a number of different architectures described further herein. The one or more components may be executed by the computer system(s) in any suitable manner known in the art.

The DML defect detection model is configured for projecting a test image generated for a specimen and a corresponding reference image into latent space. In this manner, when two images, test and reference, are provided, the DML defect detection model will project the images into the latent space. For example, as described below, the DML defect detection model may include different CNNs for different images, respectively, input to the model. Each of the different CNNs may project its input image into latent space. "Latent space" as that term is used herein refers to the hidden layer in the DML defect detection model that contains the hidden representation of the input. Additional description of the term latent space as it is commonly used in the art can be found in "Latent Variable Modeling for Generative Concept Representations and Deep Generative Models," by Chang, published in arXiv December 2018, 18 pages, which is incorporated by reference as if fully set forth herein. Such CNNs are described further with respect to Block A shown in FIG. 2. Although the projecting step (and other steps) may be described with respect to "a test image," these steps may be performed for more than one test image generated for the specimen. For example, for each test image (or at least one or more test images) generated for a specimen, the projecting step may be independently and separately performed. The test image(s) may be generated for any suitable test (e.g., inspection, review, metrology) area on the specimen. The test images may have different sizes (e.g., patch images, die images, jobs, frames, etc.), and the sizes may be measured in pixels (e.g., 32 pixels by 32 pixels for a patch image) or in any other suitable manner. Other step(s) described herein may also be separately and independently performed for different test images.

If the DML defect detection model is used to detect defects in test images generated at different locations on the specimen, different reference images may be used in the projecting step (e.g., when different test images correspond to different portions of a design for the specimen having one or more different characteristics (such as different patterned features, the same patterned features having one or more different characteristics, etc.)). In other words, different reference images may correspond to different test images, and the reference image that is projected into latent space for any test image may be determined based on where on the specimen and/or where in a design for the specimen the test and reference images were generated. The reference images may also include different types of reference images described further herein, which may be generated in a variety of ways described herein.

In one embodiment, the test image and the corresponding reference image are for corresponding locations in different dies on the specimen. In another embodiment, the test image and the corresponding reference image are for corresponding locations in different cells on the specimen. For example, the DML described herein may be used for die-to-die type inspection or cell-to-cell type inspection. Traditional die-to-die inspection requires reference images that are collected from tools and possibly processed. The embodiments described herein may be performed using die images for the test and corresponding reference images or cell images for the test and corresponding reference images. Corresponding images from different dies and different cells may be generated and/or acquired as described further herein. The die and cell images may be further configured as described herein. In this manner, both the test and reference images may be generated using the specimen.

In some embodiments, the test image and the corresponding reference image are generated for the specimen without using design data for the specimen. For example, the defect detection described herein may be performed without design data, and the images used for defect detection may all be generated by imaging the specimen. In such instances, defect detection may also be performed independent of the design data for the specimen. In other words, none of the steps performed on the images for defect detection purposes may be performed using or based on design data for the specimen. For example, the defect detection described herein can be performed the same (with the same parameters) in all of the test images generated for the specimen (and all of the pixels in any one test image generated for the specimen) without regard to the design data for the specimen. In this manner, the defect detection may be perform in the same manner without regard to the design data corresponding to the test images (or pixels in the test images)

In an additional embodiment, the test image is generated for the specimen by an imaging system that directs energy to and detects energy from the specimen, and the corresponding reference image is generated without using the specimen. In one such embodiment, the corresponding reference image is acquired from a database containing design data for the specimen. For example, the DML described herein may be used for die-to-database defect detection. In this manner, the embodiments described herein may be performed with die image(s) for the test image and database image(s) for the corresponding reference image instead of reference images from the specimen. The test image may be generated for the specimen as described further herein and may be further configured as described herein. Generating a reference image without using a specimen may be performed by simulating a reference image from a design or design information for a specimen or in any other suitable manner known in the art. The reference image preferably simulates what a test image for a specimen would look like if the portion of the specimen for which it was generated was defect free. The design, design data, or design information may include any suitable design, design data, or design information known in the art, and these terms are used interchangeably herein. The reference image may be acquired from the database in any suitable manner, and the database may have any suitable configuration.

In another embodiment, the one or more computer systems are configured for inputting design data for the specimen into the DML defect detection model, and the DML defect detection model is configured for performing the detecting using the design data. In this manner, the rendered design can be part of the input to the DML defect detection model. In addition, the design data can be treated as an additional image channel by the DML defect detection model. The DML defect detection model can then perform the defect detection using the rendered design. The rendered design can be used in a number of different ways by the DML defect detection model. For example, the DML defect detection model may be configured to use the rendered design to align different images to each other (e.g., by aligning multiple images to the design thereby aligning the images to a common reference). The rendered design may also be used as the reference image as described further herein or used to generate a reference image described herein. The rendered design can also be used by the DML defect detection model to set or adjust defect detection parameters, in the detecting defects step, and to classify defects. The DML defect detection model may also be configured to use the design data in any other manner known in the art of defect detection.

In an additional embodiment, the detecting is performed with one or more parameters determined from care areas for the specimen. In some such embodiments, the one or more computer systems are configured for inputting information for the care areas into the DML defect detection model. In this manner, the care areas may be treated as an additional image channel by the DML defect detection model. The care areas may be determined from the design data for the specimen in any suitable manner. In addition, the care areas may be generated by a commercially available system such as those from KLA configured with the capability to align test and/or reference images to design data with substantially high accuracy and precision. The care areas may define the areas on the specimen that are to be inspected thereby inherently also defining the areas on the specimen that are not to be inspected. The care areas may also be designed or configured to indicate which areas on the specimen are to be inspected with different parameters (e.g., different detection sensitivities). The care areas for the specimen may be determined from the design by the one or more computer systems in any suitable manner and then may be input into the DML defect detection model by the one or more computer systems so that the DML defect detection model can identify the care areas in the test images and corresponding reference images. The one or more parameters that are used to perform the detecting may also be determined by the one or more computer systems and input to the DML defect detection model. Therefore, when a care area in a test image is identified by the DML defect detection model using information about the care area input by the computer system(s), the DML defect detection model can determine the one or more parameters for defect detection in that care area from the input from the computer system(s) and perform defect detection accordingly.

In another embodiment, the detecting is performed without information for care areas for the specimen. For example, although many inspection processes are performed on the specimens described herein using care areas, the defect detection described herein does not need to be performed using any care areas. In such cases, the defect detection described herein may be performed for all of the test images that are generated for the specimen. In addition, the defect detection described herein may be performed with the same parameters for all of the pixels in all of the test images generated for the specimen. For example, the defect detection sensitivity used for all of the pixels in all of the test images may be the same.

In some embodiments, the test image is generated in a logic area of the specimen. In another embodiment, the test image is generated in an array area of the specimen. For example, the embodiments described herein can be used and configured for defect detection in both logic areas and array areas of the specimen. The logic and array areas of the specimen may include any such areas known in the art.

For one or more different portions of the test image, the DML defect detection model is configured for determining a distance in the latent space between the one or more different portions and corresponding one or more portions of the corresponding reference image. For example, both test and reference features go through Block B described further herein to measure the distance between them in latent space based on the outputs from Block B. In other words, the DML defect detection model determines how similar the test and reference images are based on how different their features are (measured by the distance in the latent space), which can then be used as described further herein to determine which of the portions contain a defect (or defect candidate) or are defective (or potentially defective).

The distance in latent space that is determined by the DML defect detection model can be a variety of different distances. For example, the distance metrics that can be determined and used by the DML defect detection model include Euclidean distance, L1 distance, L_infinity distance, Person's distance (i.e., cross correlation), Manhattan distance, generalized Lp-norm, cosine distance, etc. Such distances may be determined in any suitable manner known in the art.

In one embodiment, the different portions of the test image include different pixels in the test image. For example, the different portions of the test image may include any suitable portions, such as individual pixels or relatively small arrays of pixels (e.g., a 9×9 pixel neighborhood). The different portions of the test image may also be measured in pixels or in any other suitable measure. In this manner, the DML defect detection model determines the distance in latent space on a test image portion by test image portion basis. In other words, the distance in latent space may be separately and independently determined for the different portions of the test image such that those distances can be used for detecting defects in each of the different portions of the test image.

The DML defect detection model is further configured for detecting defects in the one or more different portions of the test image based on the distances determined for the one or more different portions of the test image, respectively. For example, the distance in latent space is used to decide whether each portion (e.g., each pixel) in the test image is defective with respect to the reference image. In this manner, the DML defect detection model may make a binary decision of whether each pixel is a defect or not. However, the DML defect detection model may also determine the defect type of each defective pixel. Therefore, the DML defect detection model may perform both detection (yes or no) and classification (which defect type). In the art, this application is called defect detection, and the methodology is called classification. Detecting defects based on the distances in latent space may be further performed as described herein.

In one embodiment, the DML defect detection model has a Siamese network architecture. In another embodiment, the DML defect detection model has a triplet network architecture. In an additional embodiment, the DML defect detection model has a quadruplet network architecture. For example, the DML can be constructed by Siamese network, triplet network, quadruplet network, etc.

A classic Siamese classification model can be extended to work with the die-to-die detection use case and other use cases described herein. A Siamese network is generally defined in the art as a neural network containing two identical subnetwork components. The inventors leveraged this concept for the embodiments described herein because Siamese models are useful for tasks that involve finding similarity or a relationship between two comparable things, which is a natural fit for the die-to-die comparison scheme that is used by the multi-die auto-thresholding (MDAT) defect detection algorithm used by some inspection systems commercially available from KLA. By using a non-linear model (e.g., a convolution neural network (CNN)), both test and reference (patch) images can be transformed into latent space, and as described further herein the distance between them (i.e., a measure of their similarity) can be constructed as an indicator of defectiveness.

Figure 2:
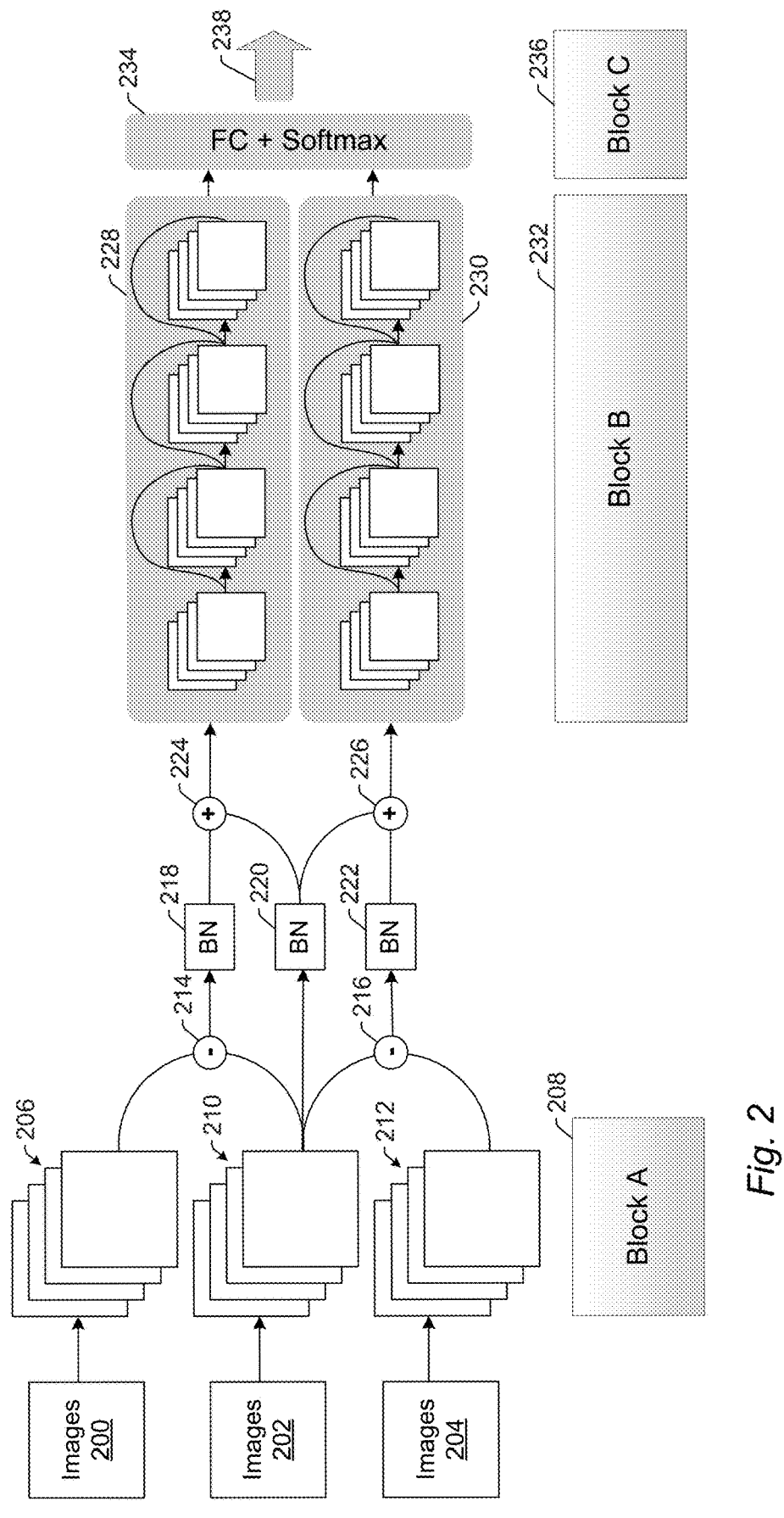
FIGS. 2 and 3 are schematic diagrams illustrating embodiments of network architectures that may be used for one or more components described herein.

Illustrated by FIG. 2, in one construction of a Siamese detection model that may be used in the embodiments described herein, the test images may include N BBP images 202 and 204 from N adjacent dies and one design image 200. These images may be selected from the same die coordinates with identical fields of view (FOV) (i.e., the same die coordinates in multiple dies centered on the same within die location). Blocks A, B, and C are three different deep CNNs. The two networks shown in Block B have the same architecture configuration. In addition to the two networks in Block B having the same architecture, the weights for both networks have to be shared by the networks for the network to have a Siamese architecture. First, the test images go through Block A to calculate the reference features, which is the average of N outputs from Block A. Second, both test and reference features go through Block B to measure the distance between them based on the outputs from Block B. Third, Block C is applied to generate the final labels (defective vs. non-defective) for each image pixel location.

For example, as shown in FIG. 2, design image 200 is input to first CNN 206 in Block A 208, optical image 202 is input to CNN 210 in Block A, and optical image 204 is input to CNN 212 in Block A. CNNs 206, 210, and 212 generate reference features for each of the input images, respectively. These CNNs may have any suitable configuration known in the art.

The outputs of CNNs 206 and 210 may be input to slicing layer 214 and the outputs of CNNs 210 and 212 may be input to slicing layer 216. The slicing layers may have any suitable configuration known in the art. Outputs of slicing layers 214 and 216 may be input to batch normalization (BN) layers 218 and 222, respectively, and output of CNN 210 may be input to BN layer 220. Batch normalization may be performed as described, for example, in "Batch Normalization: Accelerating Deep Network Training by Reducing Internal Covariate Shift," by Ioffe et al., arXiv:1502.03167, Mar. 2, 2015, 11 pages, which is incorporated by reference as if fully set forth herein. The embodiments described herein may be further configured as described in this reference. Outputs of BN layers 218 and 220 may be input to concatenation layer 224, and outputs of BN layers 220 and 222 may be input to concatenation layer 226. The concatenation layers may have any suitable configuration known in the art.

The outputs of concatenation layers 224 and 226 may be input to networks 228 and 230, respectively, in Block B 232. Although networks 228 and 230 are shown schematically in FIG. 2 as residual neural networks (ResNets), generally defined in the art as a network where there are shortcuts between some layers that jump over layers in between, the networks may have any suitable configuration known in the art including plain networks (ones that don't include shortcuts) and various types of networks that include shortcuts (e.g., Highway Nets and DenseNets). Examples of some such suitable network configurations are described in "Densely Connected Convolutional Networks," by Huang et al., arXiv:1608.06993, Jan. 28, 2018, 9 pages and "Deep Residual Learning for Image Recognition," by He et al., arXiv:1512.03385, Dec. 10, 2015, 12 pages, which are incorporated by reference as if fully set forth herein. As described above, in order for networks 228 and 230 to have a Siamese configuration, the networks will have the same configuration and share the same weights.

As also mentioned above, the networks in Block B may have a triplet or quadruplet network configuration. Examples of suitable triplet network architectures that can be used for the networks in Block B can be found in "Deep Metric Learning Using Triplet Network," by Hoffer et al., arXiv:1412.6622 Dec. 4, 2018, 8 pages, which is incorporated as if fully set forth herein. Examples of suitable quadruplet network architectures that can be used for the networks in Block B can be found in "Quadruplet Network with One-Shot Learning for Fast Visual Object Tracking," by Dong et al., arXiv:1705.07222, 12 pages, which is incorporated by reference as if fully set forth herein. The embodiments described herein may be further configured as described in these references.

The outputs of networks 228 and 230 are input to fully connected layer and SoftMax layer combination 234 in Block C 236, which generates output 238, which includes the final labels described above (i.e., defective or not). The fully connected and SoftMax layers may have any suitable configuration known in the art. For example, the fully connected and SoftMax layers may be configured as described in U.S. Patent Application Publication No. 2019/0073568 published Mar. 7, 2019 by He et al., which is incorporated by reference as if fully set forth herein.

In another embodiment, the DML defect detection model includes one or more DL convolution filters, and the one or more computer systems are configured for determining a configuration of the one or more DL convolution filters based on physics involved in generating the test image. The DL convolution filters (not shown) may be located at the beginning of the neural network or any other layer of the neural network. For example, the DL convolution filters may be located before Block A shown in FIG. 2. The physics involved in generating the image may include any known, simulated, measured, estimated, calculated, etc. parameters involved in the imaging process used to generate the test image possibly in combination with any known or simulated characteristics (e.g., material, dimensional, etc.) of the specimen. For example, the physics involved in generating the test image may include the hardware configuration of the imaging tool that is used to generate the test image and any hardware settings of the elements of the imaging tool used to generate the test image. The known or simulated characteristics of the specimen may be acquired, generated, determined, or simulated in any suitable manner known in the art.

In a further embodiment, the DML defect detection model includes one or more DL convolution filters, and the one or more computer systems are configured for determining a configuration of the one or more DL convolution filters based on imaging hardware used for generating the test image. For example, the DL convolution filters can be designed based on the optical (or other, e.g., electron beam, ion beam) hardware including parameters of the hardware such as aperture, wavelength, numerical aperture (NA), etc. Such DL convolution filters may be otherwise configured as described herein.

In one such embodiment, determining the configuration of the DL convolution filter(s) includes determining one or more parameters of the one or more DL convolution filters based on a point spread function (PSF) of the imaging hardware. For example, the optical hardware information can be used to determine one or more parameters of the DL convolution filters based on a measured or simulated PSF for the tool. The PSF of the tool may be measured or simulated in any suitable manner known in the art. In this manner, the embodiments described herein may be configured for PSF-based defect detection. Unlike detection algorithms that depend on pixel-level information (e.g., MDAT), the embodiments described herein may rely on a PSF level signature to perform defect detection. The underlying assumption is that a defect signal (i.e., information content) is confined within the local neighbor context governed by optical interaction, which is approximately defined by the PSF. By utilizing the filter size in a CNN to control the FOV, the inventors investigated the detection accuracy with respect to the cutoff radius on PSF. The inventors found that the detection accuracy increased as the FOV was enlarged until it reached an area that is consistent with the calculated PSF area. The areas may be determined in pixels or any other suitable measure.

In one such embodiment, the one or more parameters of the DL convolution filters include one or more of filter size, filter symmetry, and filter depth. For example, the imaging hardware information can be used to decide the filter size, filter symmetry, filter depth, etc. (based on a measured or simulated PSF for the tool). In one such example, the filter size may be set to be equal or roughly equal to the PSF of the imaging tool.

In another such embodiment, determining the one or more parameters of the one or more DL convolution filters includes learning the one or more parameters by optimizing a loss function. For example, the one or more parameters such as those described above may be determined based on information such as that described above by learning the parameter(s) by optimizing a loss function. Optimizing a loss function may be performed in any suitable manner known in the art, and the loss function may be any suitable loss function known in the art.

In some such embodiments, determining the configuration includes selecting the one or more DL convolution filters from a predetermined set of DL convolution filters based on a PSF of the imaging hardware. For example, determining the configuration may include deciding the filters themselves (e.g., based on a measured or simulated PSF for the tool). The predetermined set of DL convolution filters may include any or all suitable known DL convolution filters. In one such embodiment, one or more parameters of the one or more DL convolution filters in the predetermined set are fixed. For example, the filter parameters may be fixed. In other words, the DL convolution filters may be used without any adjustment to the predetermined parameters. In another such embodiment, determining the configuration includes fine tuning one or more initial parameters of the one or more DL filters by optimizing a loss function. For example, the filter parameters can be fine-tuned by optimizing a loss function. Optimizing the loss function may be performed in any suitable manner, and the loss function may include any suitable loss function known in the art. The filter parameters that are optimized may include any suitable filter parameters including those described above.

In a further embodiment, the one or more components include a learnable low-rank reference image generator configured for generating the corresponding reference image, the one or more computer systems are configured for inputting one or more test images generated for the specimen into the learnable low-rank reference image generator, the one or more test images are generated for different locations on the specimen corresponding to the same location in a design for the specimen, and the learnable low-rank reference image generator is configured for removing noise from the one or more test images thereby generating the corresponding reference image. The learnable low-rank reference image generator may be further configured as described herein.

In another embodiment, the DML defect detection model is configured for projecting an additional corresponding reference image into the latent space and determining an average of the corresponding reference image and the additional corresponding reference image and a reference region in the latent space, and the one or more portions of the corresponding reference image used for determining the distance include the reference region. For example, if test and multiple reference images are provided (that is 1+N images), the DML defect detection model will project all images into the latent space and use the N reference points in the latent space to estimate the "averaged" reference points and possible reference region used to decide whether each portion in the test image is a defect or not with respect to the reference region. The multiple reference images may include any combination of the reference images (e.g., images from multiple dies or cells adjacent to the test die or cell) described herein and/or any other suitable reference images known in the art.

In a further embodiment, the corresponding reference image includes a non-defective test image for the specimen, projecting the corresponding reference image includes learning a reference region in the latent space, and the one or more portions of the corresponding reference image used for determining the distance include the reference region. For example, if only a test image is provided, the DML defect detection model can project both "defective" and "non-defective" test images into the latent space, learn the reference region in the latent space, and use it to determine if the one or more portions of the test image are a defect or not with respect to the reference region. The "non-defective" test image may be generated using the specimen, e.g., by imaging a known defect free portion of the specimen. The "non-defective" test image may also or alternatively be generated from a test image having an unknown defectivity (with a network or model configured to generate a reference image from a test image having unknown defectivity). Examples of such networks or models are described in U.S. Pat. No. 10,360,477 issued on Jul. 23, 2019 to Bhaskar et al., which is incorporated by reference as if fully set forth herein. The embodiments described herein may be further configured as described in this reference.

In some embodiments, the test image and an additional test image are generated for the specimen with different modes of an imaging system, respectively; the DML defect detection model is configured for projecting the test image and the corresponding reference image into a first latent space, projecting the additional test image and an additional corresponding reference image into a second latent space, and combining the first and second latent spaces into a joint latent space; and the latent space used for determining the distance is the joint latent space. For example, the embodiments described herein may be configured for multi-modal DML. In particular, multiple mode images may be input to the DML defect detection model as additional channels. In addition, independent DML may be applied to each mode image to construct multiple independent latent spaces and combine them as a joint latent space for distance calculations. The different, multiple modes of the imaging system may include any modes described herein (e.g., BF and DF, different detection channels such as a top channel and one or two side channels, etc.).

In another embodiment, the one or more computer systems are configured for inputting design data for the specimen into the DML defect detection model; the test image and an additional test image are generated for the specimen with different modes of an imaging system, respectively; the DML defect detection model is further configured for projecting the test image and the corresponding reference image into a first latent space, projecting the additional test image and an additional corresponding reference image into a second latent space, projecting the design data into a third latent space, and combining the first, second, and third latent spaces into a joint latent space; and the latent space used for determining the distance is the joint latent space. For example, the design or care areas can be treated as an additional image "mode" by configuring the DML defect detection model to project the design data, care areas, etc. into a latent space of its own, which is then combined with the latent spaces for test images (and their corresponding reference images) from two or more modes to generate a joint latent space that is used for defect detection. In particular, independent DML may be separately applied to each mode image and each other input (design data, care areas, etc.) to construct multiple independent latent spaces, which are then combined into a joint latent space for distance calculations. The different, multiple modes of the imaging system used in this embodiment may include any of the modes described herein. The steps of this embodiment may be otherwise performed as described further herein.

In an additional embodiment, the one or more computer systems are configured for inputting design data for the specimen into the DML defect detection model; the DML defect detection model is further configured for projecting the test image and the corresponding reference image into a first latent space, projecting the design data into a second latent space, and combining the first and second latent spaces into a joint latent space; and the latent space used for determining the distance is the joint latent space. For example, the design data can be projected by the DML defect detection model even if there is only one mode used for defect detection. In this manner, the DML defect detection model may be configured for single mode defect detection with design data projected into a separate latent space, which is combined with the latent space into which the test image is projected to generate a joint latent space that is then used for defect detection. The steps of this embodiment may otherwise be performed as described herein.

In a further embodiment, the one or more computer systems are configured for inputting design data for the specimen into the DML defect detection model; the test image and an additional test image are generated for the specimen with different modes of an imaging system, respectively; the DML defect detection model is further configured for projecting a first set that includes one or more of the test image and the corresponding reference image, the additional test image and an additional corresponding reference image, and the design data into a first latent space, projecting a second set that includes one or more of the test image and the corresponding reference image, the additional test image and the additional corresponding reference image, and the design data into a second latent space, and combining the first and second latent spaces into a joint latent space; and the latent space used for determining the distance is the joint latent space. For example, the DML defect detection model may project the images for a first mode and the design data into a first latent space, project the images for a second mode and the design data into a second latent space, combine the two latent spaces into a joint latent space, and use the joint latent space for defect detection. In this manner, the first and second sets used for the projecting step may be different combinations of the inputs to the DML defect detection model and some of the different combinations may include one or more of the same inputs. Alternatively, the first and second sets used for the projecting step may be mutually exclusive in that none of the different combinations include the same input. For example, the first set may include the images for two or more modes, and the second set may include only the design data. Otherwise, the steps of this embodiment may be performed as described further herein.

To summarize therefore, there are a number of different ways that the DML defect detection model can be configured to use the various possible inputs in the embodiments described herein. For example, design data, care areas, etc. and other non-specimen image inputs can be treated as an additional image channel by the DML defect detection model. If the design data, care areas, etc. are treated as an additional image channel for single mode inspection, the DML defect detection model may be configured to combine the single channel image with design, care areas, etc. and then project that into a latent space. If the design data, care areas, etc. are treated as an additional image channel for multiple mode inspection, the DML defect detection model may be configured to combine the multiple channels of images with the design data, care areas, etc. as a multiple channel tensor and then project that into a latent space. In this manner, multiple channels of data may be combined before being projected into a latent space.

In alternative embodiments, different channels of data may be individually projected into separate latent spaces thereby treating the different channels as different modes. For example, without design, care areas, etc., the DML defect detection model may project images for different modes into their respective latent spaces, combine the latent spaces, and calculate distance. When design, care areas, etc. are available, the DML defect detection model may project each imaging mode images to their respective latent space, project design to another latent space, then combine all imaging latent spaces and design latent space for distance calculation.

In the above embodiments, either there is only one latent space into which all the channels are projected or the number of latent spaces into which different channels are separately and independently projected is equal to the number of input channels (e.g., # of latent spaces that are combined into a joint latent space=# of modes used for inspection+# of design related inputs). However, as described above in some embodiments, the DML defect detection model may be configured so that groups (images and/or design, care areas, etc.) are defined as multi-channel inputs, and each group may be projected to one latent space. In this manner, the number of latent spaces that are combined to create a joint latent space may be greater than one and also different than the total number of inputs.

There may be two phases for using the DML defect detection model: setup and runtime. At setup, defect candidates may be provided in a pixel labeling manner. For a given training image, the defect is predetermined for each pixel. These pixel level training data are used to train the DML model at pixel level. At runtime, the DML defect detection model is used to decide "whether each pixel is a defect or not" and possibly "which defect type" for each job frame for the inspection area. The steps described herein may also be performed for pixels, job frames, or any other test image portions described herein.

The embodiments described herein may be configured to train the DML defect detection model. However, another system or method may alternatively be configured to train the DML defect detection model. In this manner, the embodiments described herein may or may not perform training of the DML defect detection model.

In one embodiment, the one or more computer systems are configured for training the DML defect detection model with one or more training images and pixel-level ground truth information for the one or more training images. In one such embodiment, the one or more training images and pixel-level ground truth information are generated from a process window qualification (PWQ) wafer. For example, a PWQ wafer is a wafer on which different device areas are formed with one or more different parameters (such as exposure and dose of a lithography process). The one or more different parameters used to form the different device areas may be selected such that defect detection-related data generated using such a wafer simulates process variations and drift. The collected data from a PWQ wafer may then be used as training data to train the DML defect detection model to achieve model stability for process variations. In other words, by training the DML defect detection model with a set of training data that captures possible process variations and drift, the DML defect detection model will be more stable to those process variations than if it was not trained with PWQ type data. The training using such data may otherwise be performed as described herein.

PWQ methods may be performed as described in U.S. Pat. No. 6,902,855 to Peterson et al. issued on Jun. 7, 2005, 7,418, 124 to Peterson et al. issued on Aug. 26, 2008, U.S. Pat. No. 7,729,529 to Wu et al. issued on Jun. 1, 2010, U.S. Pat. No. 7,769,225 to Kekare et al. issued on Aug. 3, 2010, U.S. Pat. No. 8,041,106 to Pak et al. issued on Oct. 18, 2011, U.S. Pat. No. 8,111,900 to Wu et al. issued on Feb. 7, 2012, and U.S. Pat. No. 8,213,704 to Peterson et al. issued on Jul. 3, 2012, which are incorporated by reference as if fully set forth herein. The embodiments described herein may include any step(s) of any method(s) described in these patents and may be further configured as described in these patents. A PWQ wafer may be printed as described in these patents.

In another embodiment, the one or more computer systems are configured for performing active learning for training the DML defect detection model. For example, the training process of the DML defect detection model may be combined with active learning for low defect candidate situations or online learning situations inside of a semiconductor fab. The active learning may be performed as described in U.S. Patent Application Publication No. 2019/0370955 by Zhang et al. published Dec. 5, 2019, which is incorporated by reference as if fully set forth herein. The embodiments described herein may be further configured as described in this publication.

The training data that is used for training the DML defect detection model may also include any other ground truth data such as information generated by electron beam systems, light-based systems, user(s), and physics simulation, including such data described further herein. The training data may also include any combination of such data.

The inputs to the trained DML model may vary as described herein. For example, the input images may include 1 test frame image and 1 reference frame image per mode, whether there is only one mode or multiple modes. In another example, the input images may include 1 test frame image and N reference frame images per mode, whether there is only one mode or multiple modes. In an additional example, the input images may include 1 test frame per mode (and no reference images), whether there is only one mode or multiple modes. The inputs to the DML defect detection model may also optionally include care areas (i.e., areas in which inspection or another test function is to be performed). Another optional input to the DML defect detection model includes design information for the specimen. If the DML defect detection model is being used with learnable principal component analysis (LPCA) reference image generation (described further herein), the test and reference images are used to create LPCA reference images, which are then fed to the DML defect detection model. The output of the DML defect detection model may include, for each pixel in a test frame (or another suitable test image portion), a decision of whether the pixel is a defect or not and which type of defect the pixel is (in the case of a decision that a pixel is a defect). The output may otherwise have any suitable file or format known in the art.

Another embodiment relates to a system configured to generate a reference image for a specimen. The system includes one or more computer systems and one or more components executed by the one or more computer systems. The one or more computer systems may be configured as described further herein. The one or more components may be executed by the one or more computer systems in any suitable manner. In these systems, the one or more components include a learnable low-rank reference image (LLRI) generator.

The one or more computer systems are configured for inputting one or more test images for a specimen into the LLRI generator. The one or more test images are generated for different locations on the specimen corresponding to the same location in a design for the specimen. For example, the one or more test images may be generated at corresponding locations in different dies on the specimen, different cells on the specimen, etc. The corresponding locations may therefore have the same die coordinates, the same cell coordinates, etc. in addition to the same FOV (area on the specimen or in the images). The computer system(s) may input the test images(s) into the LLRI generator in any suitable manner.

The LLRI generator is configured for removing noise from the one or more test images thereby generating one or more reference images corresponding to the one or more test images. For example, portions of a test image that correspond to defects may appear noisier than other portions of the test image (e.g., they may have signals that are outliers with respect to other portions of the image, and whether or not a signal is an outlier can be defined in a number of different ways known in the art). Therefore, by identifying and removing noise from the one or more test images, the resulting images may be suitable for use as a reference for defect detection (and other) purposes. The one or more reference images may then be used for defect detection as described further herein. The LLRI generator may have one of various configurations described herein and may perform noise removal as described further herein.

A technique known in the art as "low rank constraint" can be used in outlier detection algorithms such as computed reference (CR) and Tensor Decomposition (TD). The embodiments described herein can extend the low rank constraint technique to spatial context and leverage this concept in DL classification.

Principle Component Analysis (PCA) is one tool that the inventors explored for the low rank constraint in CR. When PCA is applied to the multiple image reconstruction problem, the problem statement can be summarized as below. Given X is a 3D tensor (usually removed DC component) with dimension of (w*h, c), where w, h, and c are width, height, and number of images, respectively, PCA tries to find the principle component vector w with dimension of (c, 1), which maximizes the variance estimation, $$w^* = \arg\max_w \frac{w^T X^T X w}{w^T w} \qquad \text{(Equation 1)}$$

where T is the matrix transpose operator. The principle component is defined as:

$$\text{p.c.} = Xw \qquad \text{(Equation 2)}$$

The multiple principle component vectors can be computed via iterative PCA, matrix orthogonization, singular value decomposition (SVD), etc. The low rank approximation is usually applied via filtering on the principle components based on their eigenvalues. A larger eigenvalue corresponds to larger variance direction for the image data. The reconstruction of X under the low rank approximation can be achieved by:

$$X' = (XW)W^T \qquad \text{(Equation 3)}$$

where W is the 2D matrix consisting of the selected principle component vectors in column format, i.e., $\{w_1, w_2, \ldots\}$.

The above problem statement is quite classical and known in the art. One downside for such a problem statement is that it treats the pixels in an image as a group of independent values. Therefore, if pixels in the same image are permutated, the PCA will generate identical principle components and reconstruction, which is commonly believed inadequate for describing the spatial information in 2D images.

In another embodiment, the LLRI generator includes a spatial low-rank neural network model. For example, the LPCA may be a spatial neural PCA. To extend the PCA to capture the spatial correlation, we introduce the PCA with Spatial Context or SpatialPCA below. First, we redefine X as a 3D tensor with dimensions of (w, h, c), and the principle component vector w is defined as a collection of spatial kernels for X with dimension of (w', h', c, 1). Similar to PCA, we can compute the principle components via 2D convolution layer as $$\text{p.c.} = X \oplus w \qquad \text{(Equation 4)}$$

The objective of SpatialPCA is $$w^* = \arg\max_w \frac{(X^T \otimes w^T)(X \otimes w)}{w^T w} \qquad \text{(Equation 5)}$$

equivalently, by using auto-correlation AC(•), $$w^* = \arg\max_w \frac{w^T AC(X)w}{w^T w} \qquad \text{(Equation 6)}$$

The auto-correlation function AC(•) computes the covariance matrix of input X with a shifted version of itself. The principle component vectors can be solved similarly by iterative PCA, orthogonization, and SVD.

For Learnable PCA, SpatialPCA is extended to incorporate with a supervised classifier, so as to adapt the low rank constraints in DL classification.

Before demonstrating the combined solution, we need to adapt the SpatialPCA implementation using 2D convolution operations. We have three computations that are required to be mapped to conv2d:

Compute the auto-correlation of X.
Compute the principle component, given X and w.
Compute the reconstruction of X, given truncated p.c. and w.

Given input images of X with dimensions of (n, w, h, c) and learnable principle component vectors w with dimensions of (w', h', c, o), where w and h (or w' and h') are the width and height of input (or filters), n is the size of mini-batch, c is the number of channels for inputs (the third dimension of w equals to c), and o is the output dimension in for conv2D and it satisfies o=w'*h'*c in non-truncated PCA.

The principle component and the reconstruction of X can be computed via tensorflow or alternative DL frameworks.

Given the filter w with truncation to i, the X can be reconstructed as below.

$$X' = \frac{1}{w'h'} X \otimes w(:, :, :, :i) \otimes w(:, :, :, :i)^T \qquad \text{(Equation 7)}$$

Therefore, the SpatialPCA can be solved by the following optimization $$w^* = \arg\min_w \left\| X - \frac{1}{w'h'} X \otimes w(:, :, :, :i) \otimes w(:, :, :, :i)^T \right\|_2^2 \qquad \text{(Equation 8a)}$$

$$\text{s.t. } w^T \cdot w = I \qquad \text{(Equation 8b)}$$

Several observations made by the inventors in numerical experiments include:

Orthogonization constraints are strong to keep the model closer to PCA.

L1 loss for reconstruction is better than L2.

The model can be used to enhance difference signal depending on the objectives.

In one embodiment, the LLRI generator includes a learnable principle component analysis (PCA) model. Learnable PCA (LPCA) is introduced in the embodiments described herein to enhance weaker signals in the presence of color variations. Traditionally, PCA is one approach to selectively construct the low frequency reference by removing the higher order principle components. The focus of LPCA is slightly broader than PCA; besides removing color variations, LPCA is also expected to enhance the salient signals at the same time.

$$X' = \frac{1}{w'h'} X^* w(:, :, :, :i)^* \omega(:, :, :, :i)^T \qquad \text{(Equation 9)}$$

LPCA is derived from the original PCA reconstruction formula by extending it to spatial 2D PCA, as demonstrated by Equation 9. (Note, the * operator in Equation 9 is a convolution operator.) T is the matrix transpose operator. Thus, the PCA reconstruction can be expressed as a shallow CNN with two convolution layers.

$$\omega^* = \arg\min_w \left\| X - \frac{1}{w'h'} X^* \omega^* \omega^T \right\| \qquad \text{(Equation 10)}$$

$$\text{s.t. } \omega^T \cdot \omega = 1$$

LPCA solves the low-rank filters via optimization (See Equation 10), instead of diagonalization. This approach provides the freedom to directly chain the LPCA network with any detection or classification network follows on.

In another embodiment, the LLRI generator includes a learnable independent component analysis (ICA) model or a learnable canonical correlation analysis (CCA) model. In this manner, the LLRI generator may be a PCA, ICA, CCA, etc. type of model. In addition, the LLRI generator may be a Tensor Decomposition model. Examples of suitable ICA model configurations for use in the embodiments described herein can be found in "Independent Component Analysis: Algorithms and Applications," by Hyvärinen et al., Neural Networks, 13(4-5):411-430, 2000, which is incorporated by reference as if fully set forth herein. Description of examples of CCA models that may be adapted for use in the embodiments described herein are described in "A Tutorial on Canonical Correlation Methods," by UUrtio et al., arXiv: 1711.02391, Nov. 7, 2017, 33 pages, which is incorporated by reference as if fully set forth herein. Examples of suitable Tensor Decomposition Models that can be adapted for use in the embodiments described herein are described in "Introduction to Tensor Decompositions and their Applications in Machine Learning," by Rabanser et al., arXiv:1711.10781, Nov. 29, 2017, 13 pages, which is incorporated by reference as if fully set forth herein. The embodiments described herein may be further configured as described in these references.

In some embodiments, the LLRI generator includes a linear or non-linear regression model. Any suitable linear or non-linear regression model known in the art may be adapted for use as the LLRI generator described herein.

In a further embodiment, the LLRI generator includes a spatial low-rank probabilistic model. For example, the LLRI generator may be a Bayesian CNN. Examples of Bayesian CNN's can be found in "A Comprehensive guide to Bayesian Convolutional Neural Network with Variational Inference," Shridhar et al., arXiv:1901.02731, Jan. 8, 2019, 38 pages, which is incorporated by reference as if fully set forth herein. The spatial low-rank probabilistic model may also be a probabilistic PCA model, examples of which may be adapted for use in embodiments described herein can be found in "Probabilistic Principal Component Analysis," by Tipping and Bishop, Journal of the Royal Statistical Society, Series B, 61, Part 3, pp. 611-622, Sep. 27, 1999, and "Probabilistic Principal Component Analysis for 2D data," by Zhao et al., Int. Statistical Inst.: Proc. 58th World Statistical Congress, August 2011, Dublin, pp. 4416-4421, which are incorporated by reference as if fully set forth herein. The embodiments described herein may be further configured as described in these references.

In one embodiment, the different locations include locations in different dies on the specimen. In another embodiment, the different locations include multiple locations in only one die on the specimen. For example, the one or more test images may be generated for corresponding locations in different dies on the specimen, corresponding locations in different cells on the specimen, etc. Multiple cells may be located in every die on the specimen. Therefore, the test image(s) may be generated in only one die on the specimen at one or more locations of one or more cells in the die.

In a further embodiment, the one or more test images correspond to a job frame generated for the specimen by an imaging system, and the one or more computer systems are configured for repeating the inputting for one or more other test images corresponding to a different job frame generated for the specimen by the imaging system such that the LLRI generator separately generates the one or more reference images for the job frame and the different job frame. For example, there may be two phases for using the LLRI generator: setup and runtime. At setup, defect candidates can be used to learn the LLRI generation for each die. If no defect candidate is available, LPCA is reduced to normal PCA. At runtime, the LLRI is generated for each job frame for the inspection area. In other words, different reference images may be generated for different job frames, respectively. The job frames for which the reference images are generated may include all of the job frames in which a test (inspection, defect review, metrology, etc.) is performed. In this manner, inputs to the trained LLRI generator may include N frame images for different dies at the same relative die location in the case of die-to-die type inspection or N cell images from different cells for cell-to-cell type inspection, and the trained LLRI generator may output N reference images.

In some embodiments, the one or more test images are generated for the specimen by an imaging system using only a single mode of the imaging system. For example, the test images for which a reference image is generated may include only test images generated using the same mode. The mode of the imaging system may include any of the modes described herein.

In another embodiment, the one or more test images are generated for the specimen by an imaging system using only a single mode of the imaging system, and the one or more computer systems are configured for repeating the inputting for one or more other test images generated for the specimen by the imaging system using a different mode of the imaging system such that the LLRI generator generates the one or more reference images for the one or more other test images. In this manner, different reference images may be generated for test images generated with different modes. Separately and independently generating reference images for test images generated with different modes will be important for multi-mode inspection and other tests since the test images and the noise in the test images can vary dramatically from one mode to another. Therefore, a generated reference image that is suitable for use with one mode may not be also suitable for use with a different mode. The different modes for which reference images are generated may include any of the multiple modes described herein.

A defect detection component detects defects on the specimen based on the one or more test images and their corresponding one or more reference images. Therefore, the reference images generated by the LLRI generator can be used to detect defects on the specimen. The defect detection that is performed with the generated reference images may include the defect detection described herein or any other suitable defect detection known in the art. In other words, the reference images generated by the LLRI generator may be used in the same manner as any other reference image in any defect detection method.

In one embodiment, the defect detection component is included in the one or more components executed by the one or more computer systems. In this manner, the embodiments may include a combination of a LLRI generator and a defect detection component, which may be one of the supervised or unsupervised detectors/classifiers described herein. The defect detection component may therefore be included in the components that are executed by the one or more computer systems included in the system. In other words, the systems described herein may perform defect detection using the generated reference images. Alternatively, the defect detection component may be included in another system that performs the defect detection. For example, the reference images generated as described herein may be stored in a computer-readable medium that is accessible by another system or otherwise transmitted or made available to the other system so that the other system can perform defect detection using the generated reference images.

In one such embodiment, the one or more computer systems are configured for jointly training the LLRI generator and the defect detection component with one or more training images and pixel-level ground truth information for the one or more training images. The pixel-level ground truth information may include labels generated by manual classification, electron beam detection model, or hybrid inspector. Hybrid inspection may be performed as described in U.S. Patent Application Publication No. 2017/0194126 by Bhaskar et al. published Jul. 6, 2017, which is incorporated by reference as if fully set forth herein. The combined LLRI generator and defect detection component may then be trained using images (e.g., optical images) and the pixel-level ground truth information. Training the combined LLRI generator and/or the defect detection component may be performed in any suitable manner known in the art (e.g., modifying one or more parameters of the generator and/or defect detection component until the detection and/or classification results generated by the generator and/or defect detection component match the ground truth information for the inputs).

In some such embodiments, the one or more training images include images for one or more defect classes selected by a user. For example, a user can decide the critical key defect types in a given specimen layer; otherwise, by default all defect types are considered as equally important. Candidate defect samples for selected key defect types can be obtained, for example, from the user, by BBP defect discovery, or electron beam inspection defect discovery. In this manner, selected (not all) or all defect types can be assigned to the model learning for targeted sensitivity enhancement. In a similar manner, selected (or not all) or all defect types may be assigned to the model learning for targeted nuisance reduction.

In another such embodiment, the one or more training images include images for one or more hot spots on the specimen selected by a user. "Hot spots" are generally defined in the art as locations in a design for a specimen that are known (or suspected) to be more susceptible to defects. Hot spots may be selected by a user in any suitable manner. Hot spots can also be defined and discovered as described in U.S. Pat. No. 7,570,796 issued on Aug. 4, 2009 to Zafar et al. and U.S. Pat. No. 7,676,077 issued on Mar. 9, 2010 to Kulkarni et al., which are incorporated by reference as if fully set forth herein. The embodiments described herein may be further configured as described in these patents.

In an additional such embodiment, the one or more training images include images for one or more weak patterns in a design for the specimen selected by a user. "Weak patterns" are generally defined in the art as patterns in a design for a specimen that are known (or suspected) to be more susceptible to defects than other patterns in the design. Weak patterns may be selected by a user in any suitable manner. Weak patterns can also be defined and discovered as described in the above-referenced patents by Zafar and Kulkarni. In some instances, weak patterns may also be designated as hot spots (and vice versa) although that is not necessarily always true (i.e., a weak pattern may be identified as a hot spot in a design but a hot spot does not necessarily have to be defined at a weak pattern and vice versa).

In one embodiment, the pixel-level ground truth information is generated by an electron beam imaging system. For example, the training ground truth data may come from an electron beam system such as an electron beam inspection system, an electron beam defect review system, a SEM, a transmission electron microscope (TEM), etc. The electron beam imaging system may be further configured as described herein and may or may not be part of the system. For example, the systems described herein may be configured to generate the pixel-level ground truth information using electron beam imaging, and the computer system(s) described herein may generate ground truth information for the electron beam images. Alternatively, another system or method may generate electron beam ground truth information, and such information may be acquired by the embodiments described herein.

In another embodiment, the pixel-level ground truth information is generated by a light-based system. For example, the training ground truth data may come from a light-based system such as a light-based inspection system (possibly one configured for substantially high resolution or used in a high resolution mode), a light-based defect review system, etc. The light-based system may be further configured as described herein and may or may not be part of the system. For example, the systems described herein may be configured to generate the pixel-level ground truth information using light-based imaging and the computer system(s) described herein may generate ground truth information for the light-based images. Alternatively, another system or method may generate light-based ground truth information, and such information may be acquired by the embodiments described herein.

In some embodiments, the pixel-level ground truth information includes information received from a user. For example, the system may receive ground truth information from a user for one or more training images generated for a training specimen. In one such example, electron beam images of a training specimen may be displayed to a user, and the user may input information for the electron beam images such as whether or not the images include a defect and possibly what type of defect is shown in the images. Such information may be acquired by the systems described herein by displaying the images to a user and providing capability for the user to input the information. Such information may also or alternatively be acquired by the embodiments described herein from another method or system that acquired the information from the user.

In a further embodiment, the pixel-level ground truth information includes information for the one or more training images generated from results of physics simulation performed with the one or more training images. The physics simulation may include any simulation known in the art. For example, for a defect that is shown in a training image, the physics simulation may include simulating how that defect will affect the physics of a device formed using the specimen on which the defect is located. Such simulations may be performed in any suitable manner known in the art. The results of the physics simulation may then be used to generate additional information for the defects, which is used as the pixel-level ground truth information. For example, the results of the physics simulation may show that the defect will cause one type of problem in the device (e.g., short, open, etc.), and the defect can then be assigned a classification that indicates that type of problem. Such classifications can then be used as the pixel-level ground truth information for the defects. Any other information that can be generated from such physics simulation may also or alternatively be used as the pixel-level ground truth information. Such pixel-level ground truth information may be performed by the embodiments described herein. Alternatively, the pixel-level ground truth information generated using physics simulation may be acquired from another method or system that generated such pixel-level ground truth information.

In a further embodiment, the pixel-level ground truth information includes information converted into a first format from known defect locations in a second format different than the first format. For example, known defect locations may be converted to pixel-level ground truth data. In addition, defect information in one format (e.g., a KLARF file, which is a proprietary file format used by tools commercially available from KLA, a results file generated by Klarity, which is a tool that is commercially available from KLA, a lot result, etc.) can be converted to pixel-level ground truth data. The format into which the defect information is converted (i.e., the pixel-level ground truth information) may be the format of the images that will be input to the DML defect detection model during use and the output that would be generated by the images by the DML defect detection model (i.e., an input image and the label that would be generated by the DML defect detection model for the input image).

The known defect locations may be "known" in a number of different ways, via inspection and review, via programmed defects or synthetic defects, via simulation, etc. The known defect locations can be converted to pixel-level ground truth data in any suitable manner. The known defect locations may be converted to pixel-level ground truth data by the one or more computer systems of the embodiments described herein. Alternatively, another system or method may convert the known defect information to pixel-level ground truth data, and the embodiments described herein may acquire that pixel-level ground truth data from the other method or system in any suitable manner. Some examples of systems and methods that may acquire known defect location data that may be converted into pixel-level ground truth data for use in the embodiments described herein are described in U.S. Patent Application Publication No. 2019/0303717 by Bhaskar et al. published Oct. 3, 2019, which is incorporated by reference as if fully set forth herein. The embodiments described herein may be further configured as described in this publication.

In one embodiment, the defect detection component includes a DL defect detection component. In such an embodiment, the DL detection component may or may not be a DML defect detection model as described further herein. In this manner, in one embodiment of LLRI based detection, the LLRI generator may be combined with a DL CNN to form an end-to-end learning system to simultaneously learn the "best" approximated low-rank transformation and pixel-level detection/classifier for user-selected classes of defects. Such an embodiment therefore marries the stability of low-rank with the power of a DL detector/classifier. The DL defect detection component may also be a machine learning (ML), feature-based detection model such as a decision tree, random forest, support vector machine (SVM), etc. The DL defect detection component may also be a DL-based detection model such as a CNN, Bayesian CNN, Metric CNN, Memory CNN, etc. Examples of Memory CNN's are described in "Disease Detection in Weakly Annotated Volumetric Medical Images using a Convolutional LSTM Network," by Braman et al., arXiv: 1812.01087, Dec. 3, 2018, 4 pages, and "LSTM Pose Machines," by Luo et al., arXiv:1712.06316, Mar. 9, 2018, 9 pages, which are incorporated by reference as if fully set forth herein. Metric CNNs are a type of CNN that uses a similarity measure (metric) for determining if two things (e.g., images) match. Examples of Metric CNNs are described in "Learning visual similarity for product design with convolutional neural networks," by Bell et al., ACM Transactions on Graphics (TOG), Volume 34, Issue 4, July 2015, Article No.: 98, pp. 1-10 and "DARI: Distance Metric and Representation Integration for Person Verification," by Wang et al., Proceedings of the Thirtieth AAAI Conference on Artificial Intelligence, pp. 3611-3617 February 2016, published by the AAAI Press, Palo Alto, Calif., which are incorporated by reference as if fully set forth herein. The embodiments described herein may be further configured as described in any or all of the above references.

In some embodiments, the defect detection component is not configured as a defect classifier. In other words, the defect detection component may detect events on the specimen but not identify any type of defect that the events are. Such a defect detection component also may or may not perform nuisance filtering of the detected events. The defect detection component may however also perform defect classification and nuisance filtering as described further herein. Alternatively, a defect classification component (that may or may not be included in the components executed by the one or more computer systems included in the system) may perform classification of the defects detected by the defect detection component. Some examples of defect detection components that may also perform defect classification and are ML based are described in U.S. Patent Application Publication No. 2019/0073568 published Mar. 7, 2019 by He et al., which is incorporated by reference as if fully set forth herein. Some examples of ML based defect detectors are described in U.S. Pat. No. 10,186,026 issued Jan. 22, 2019 by Karsenti et al., which is incorporated by reference as if fully set forth herein. The embodiments described herein may be further configured as described in these references.

In a further embodiment, the defect detection component includes a non-DL defect detection component. For example, the defect detection component may perform a classical defect detection such as subtracting a LLRI from a corresponding test image to generate a difference image and then using the difference image to detect defects on the specimen. In one such example, the defect detection component may be a thresholding-based defect detection component in which a reference image generated as described herein is subtracted from a corresponding test image, and the resulting difference image is compared to a threshold. In the simplest version of a thresholding-algorithm, any signals or output having a value above the threshold may be identified as potential defects or defect candidates and any signals or output that do not have a value above the threshold are not identified as potential defects or defect candidates. However, the thresholding algorithm may be relatively complex compared to that described above as in a MDAT algorithm and/or an LCAT algorithm, which are available on some systems commercially available from KLA.

Figure 3:
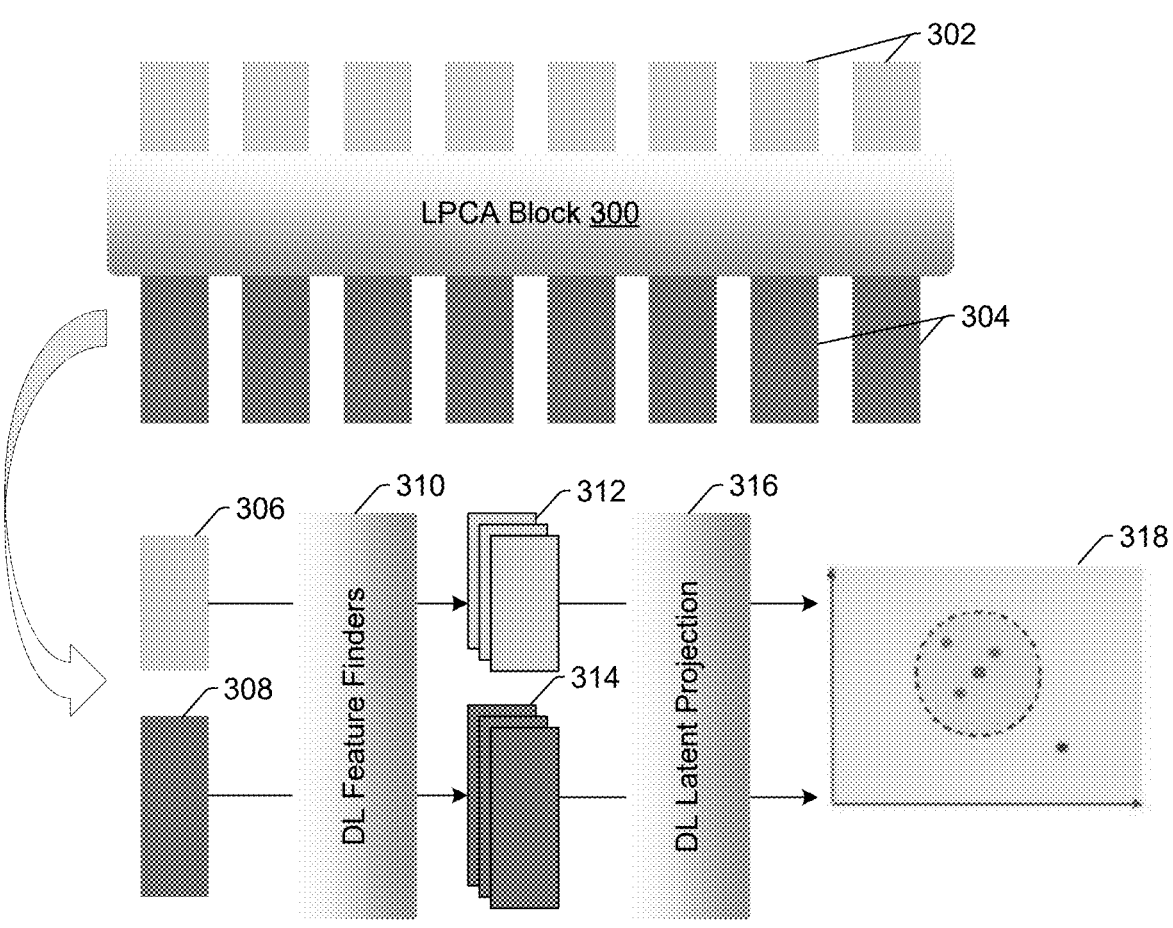

In another embodiment, the defect detection component includes a DML defect detection model. In this manner, the LLRI generator can be combined with DML detection. In one such embodiment, the LLRI generator is shown as LPCA block 300 in FIG. 3 that includes two convolution layers for the math. The inputs to the LPCA block are N die images for the same relative die location but different dies (or cells depending on how the defect detection will be performed). For example, as shown in FIG. 3, the inputs to LPCA block 300 may include N die images 302, each of which is acquired at the same relative die location but different dies. The outputs for the LPCA block are the N reference images after removing both low-frequency and high-frequency noises. For example, as shown in FIG. 3, the outputs of the LPCA block are N reference images 304, one for each of the input die images.

In this construction (other constructions are possible), both original die images and post-LPCA reference images are input to the DML detection model. For example, as shown in FIG. 3, a pair of test and corresponding, LPCA generated reference images (e.g., a pair of test image 306 and corresponding, LPCA-generated reference image 308) may be input to DL Feature Finders 310, which may output features 312 for the test image and features 314 for the reference image. The distance in latent space is determined to decide whether each pixel in the test image is a defect or not. For example, as shown in FIG. 3, features 312 and 314 may be input to DL Latent Projection 316, which may project the features in latent space 318. Defect detection may then be performed based on the distances between the features in latent space as described further herein. The layers in the detection block are different than the layers in the LPCA block. The loss function is a combination of LPCA loss and DML loss (e.g., Siamese loss). Although using the LPCA-generated reference images with DML detection can provide a relatively high sensitivity compared to other detection methods and systems, the LPCA-generated reference images can be used with any other defect detection algorithms such as those described further herein.

In one embodiment, the LLRI generator and the defect detection component are configured for inline defect detection. For example, the reference images may be generated and the defect detection may be performed using the generated reference images as the specimen is being scanned by an imaging system (i.e., on the fly as the test images are being generated). In this manner, the reference images may not be generated prior to specimen scanning.

In another embodiment, the LLRI generator and the defect detection component are configured for offline defect detection. For example, the reference images may be generated and the defect detection may be performed using the generated reference images after the specimen has been scanned by the imaging system (i.e., after the test images have been generated). In one such example, the test images may be generated and stored in a computer-readable storage medium by a system that includes the imaging system that generated the test images. The embodiments described herein may then access the test images in the storage medium and use them as described herein.

In some embodiments, the one or more components include a defect classification component configured for separating the detected defects into two or more types, and the defect classification component is a DL defect classification component. The DL defect classification component may be configured as described in U.S. Pat. No. 10,043,261 issued on Aug. 7, 2018 to Bhaskar et al. and U.S. Pat. No. 10,360,477 issued on Jul. 23, 2019 to Bhaskar et al. and U.S. Patent Application Publication No. 2019/0073568 published Mar. 7, 2019 by He et al., which are incorporated by reference as if fully set forth herein. The embodiments described herein may be further configured as described in these publications.

In one embodiment, the specimen is a wafer on which a layer of patterned features has been formed using multiple lithography exposure steps. For example, the specimen may be a double or other patterned wafer in which one set of patterned features is formed on one layer of the wafer in one lithography exposure step and another set of patterned features is formed on the same layer of the wafer in another lithography exposure step. The multiple lithography exposure steps may be performed in any suitable manner known in the art. In another embodiment, the specimen is a wafer on which a layer of patterned features has been formed using extreme ultraviolet (EUV) lithography. The EUV lithography may be performed in any suitable manner known in the art. For example, the embodiments described herein provide an approximated low-rank supervised/semi-supervised defect detection algorithm with enhanced sensitivity for targeted defects, especially for smaller defects in double/quadruple pattern and EUV lithography on optical and other inspection tools.

The implementation of the construction of the embodiments described herein may be fully implemented on GPU acceleration. For example, the LPCA block can be implemented as two convolution layers, which can be constructed as a relatively small neural network. Both training (setup) and inference can be directly run on GPU. The construction is also runnable on CPU or other accelerator chips.

Each of the embodiments of each of the systems described above may be combined together into one single embodiment. The embodiments described herein may also be further configured as described in U.S. Patent Application Publication Nos. 2017/0194126 by Bhaskar et al. published Jul. 6, 2017 and 2018/0342051 by Sezginer et al. published Nov. 19, 2018, which are incorporated by reference as if fully set forth herein.

The embodiments described herein have a number of advantages over other methods and systems for defect detection. For example, the embodiments described herein can deal with intra-wafer and (possibly) inter-wafer process variation (e.g., because the reference images generated as described herein will be substantially immune to intra-wafer and inter-wafer process variations). Another advantage is that the reference images generated by the embodiments described herein can be learned for optimal defect detection for user-specified defects, hot spots, or weak patterns. This method will limit unpredictable sensitivity degrading. In addition, the embodiments described herein can enhance defect sensitivity for targeted defect types, extending the BBP defect sensitivity limits. Moreover, the embodiments described herein can greatly enhance BBP sensitivity and decrease the cost-of-ownership of BBP tools by providing better usability of targeted sensitivity in research and development and high volume manufacturing use cases. The embodiments described herein also advantageously can couple defect classifier learning with reference generation, which permits selective sensitivity enhancement. Furthermore, as approximated low-rank constraint is applied, the embodiments described herein have a much lower demand on labeled defect candidates. An additional advantage of the embodiments described herein is that they can be used for a variety of different inspection types. For example, as described further herein, the systems can be configured for die-to-die inspection, cell-to-cell inspection, and standard reference inspection, each of which may be performed with only a single optical mode or multiple optical modes.

Another embodiment relates to a computer-implemented method for detecting defects on a specimen. The method includes projecting a test image generated for a specimen and a corresponding reference image into latent space. The method also includes, for one or more different portions of the test image, determining a distance in the latent space between the one or more different portions and corresponding one or more portions of the corresponding reference image. In addition, the method includes detecting defects in the one or more different portions of the test image based on the distances determined for the one or more different portions of the test image, respectively. The projecting, determining, and detecting steps are performed by a DML defect detection model that is included in one or more components executed by one or more computer systems.

Each of the steps of the method may be performed as described further herein. The method may also include any other step(s) described herein. The computer system(s) may be configured according to any of the embodiments described herein, e.g., computer subsystem(s) 102. In addition, the method described above may be performed by any of the system embodiments described herein.

A further embodiment relates to a method for generating a reference image for a specimen. The method includes removing noise from one or more test images for a specimen thereby generating one or more reference images corresponding to the one or more test images by inputting the one or more test images into a LLRI generator. The one or more test images are generated for different locations on the specimen corresponding to the same location in a design for the specimen. The LLRI generator is included in one or more components executed by one or more computer systems. The method may also include detecting defects on the specimen based on the one or more test images and their corresponding one or more reference images. The detecting may be performed by a defect detection component that may or may not be included in the one or more components executed by the one or more computer systems.

Each of the steps of this method may be performed as described further herein. This method may also include any other step(s) described herein. These computer system(s) may be configured according to any of the embodiments described herein, e.g., computer subsystem(s) 102. In addition, the method described above may be performed by any of the system embodiments described herein.

Figure 4:
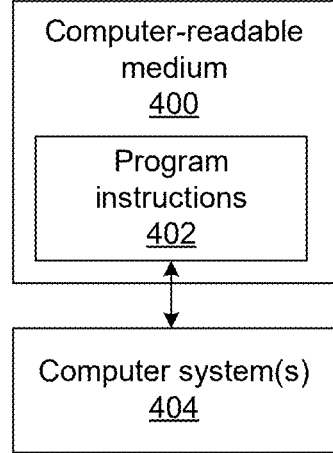
FIG. 4 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for detecting defects on a specimen and/or generating a reference image for a specimen. One such embodiment is shown in FIG. 4. In particular, as shown in FIG. 4, non-transitory computer-readable medium 400 includes program instructions 402 executable on computer system(s) 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 404 may be configured according to any of the embodiments described herein.

Further modifications and alternative embodiments of various aspects of the invention will be apparent to those skilled in the art in view of this description. For example, methods and systems for learnable defect detection for semiconductor applications are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments.

Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to generate a reference image for a specimen, comprising:

one or more computer systems; and one or more components executed by the one or more computer systems, wherein the one or more components comprise a learnable low-rank reference image generator, wherein the one or more computer systems are configured for inputting one or more test images for a specimen into the learnable low-rank reference image generator, wherein the one or more test images are generated for different locations on the specimen corresponding to the same location in a design for the specimen, and wherein the learnable low-rank reference image generator is configured for removing noise from the one or more test images thereby generating one or more reference images corresponding to the one or more test images; and wherein a defect detection component detects defects on the specimen based on differences between the one or more test images and their corresponding one or more reference images.

2. The system of claim 1, wherein the defect detection component comprises a deep learning defect detection component.

3. The system of claim 1, wherein the defect detection component comprises a deep metric learning defect detection model.

4. The system of claim 1, wherein the specimen is a wafer on which a layer of patterned features has been formed using multiple lithography exposure steps.

5. The system of claim 1, wherein the specimen is a wafer on which a layer of patterned features has been formed using extreme ultraviolet lithography.

6. The system of claim 1, wherein the learnable low-rank reference image generator comprises a learnable principle component analysis model.

7. The system of claim 1, wherein the learnable low-rank reference image generator comprises a learnable independent component analysis model or a learnable canonical correlation analysis model.

8. The system of claim 1, wherein the learnable low-rank reference image generator comprises a linear or non-linear regression model, a spatial low-rank neural network model, or a spatial low-rank probabilistic model.

9. The system of claim 1, wherein the defect detection component is included in the one or more components executed by the one or more computer systems, and wherein the one or more computer systems are further configured for jointly training the learnable low-rank reference image generator and the defect detection component with one or more training images and pixel-level ground truth information for the one or more training images.

10. The system of claim 9, wherein the one or more training images comprise images for one or more defect classes selected by a user, images for one or more hot spots on the specimen selected by the user, or images for one or more weak patterns in a design for the specimen selected by the user.

11. The system of claim 9, wherein the pixel-level ground truth information comprises information for the one or more training images generated from results of physics simulation performed with the one or more training images.

12. The system of claim 9, wherein the pixel-level ground truth information comprises information converted into a first format from known defect locations in a second format different than the first format.

13. The system of claim 1, wherein the learnable low-rank reference image generator and the defect detection component are further configured for inline defect detection.

14. The system of claim 1, wherein the one or more components further comprise a defect classification component configured for separating the detected defects into two or more types, and wherein the defect classification component is a deep learning defect classification component.

15. The system of claim 1, wherein the different locations comprise locations in different dies on the specimen.

16. The system of claim 1, wherein the different locations comprise multiple locations in only one die on the specimen.

17. The system of claim 1, wherein the one or more test images correspond to a job frame generated for the specimen by an imaging system, and wherein the one or more computer systems are further configured for repeating the inputting for one or more other test images corresponding to a different job frame generated for the specimen by the imaging system such that the learnable low-rank reference image generator separately generates the one or more reference images for the job frame and the different job frame.

18. The system of claim 1, wherein the one or more test images are generated for the specimen by an imaging system using only a single mode of the imaging system, and wherein the one or more computer systems are further configured for repeating the inputting for one or more other test images generated for the specimen by the imaging system using a different mode of the imaging system such that the learnable low-rank reference image generator generates the one or more reference images for the one or more other test images.

19. A computer-implemented method for generating a reference image for a specimen, comprising:

inputting one or more test images for a specimen into a learnable low-rank reference image generator, wherein the learnable low-rank reference image generator is included in one or more components executed by one or more computer systems, wherein the one or more test images are generated for different locations on the specimen corresponding to the same location in a design for the specimen, and wherein the learnable low-rank reference image generator is configured for removing noise from the one or more test images thereby generating one or more reference images corresponding to the one or more test images; and detecting defects on the specimen based on differences between the one or more test images and their corresponding one or more reference images.

20. A non-transitory computer-readable medium storing program instructions executable on one or more computer systems for performing a computer-implemented method for generating a reference image for a specimen, wherein the computer-implemented method comprises:

inputting one or more test images for a specimen into a learnable low-rank reference image generator, wherein the learnable low-rank reference image generator is included in one or more components executed by the one or more computer systems, wherein the one or more test images are generated for different locations on the specimen corresponding to the same location in a design for the specimen, and wherein the learnable low-rank reference image generator is configured for removing noise from the one or more test images thereby generating one or more reference images corresponding to the one or more test images; and detecting defects on the specimen based on differences between the one or more test images and their corresponding one or more reference images.

\* \* \* \* \*